Oct. 26, 1965  D. H. LINSON  3,214,658
CAPACITOR INCLUDING ALUMINUM SILICATE SCAVENGER
Filed Dec. 3, 1962

INVENTOR.
DONALD H. LINSON

Oct. 26, 1965  D. H. LINSON  3,214,658
CAPACITOR INCLUDING ALUMINUM SILICATE SCAVENGER
Filed Dec. 3, 1962  2 Sheets-Sheet 2
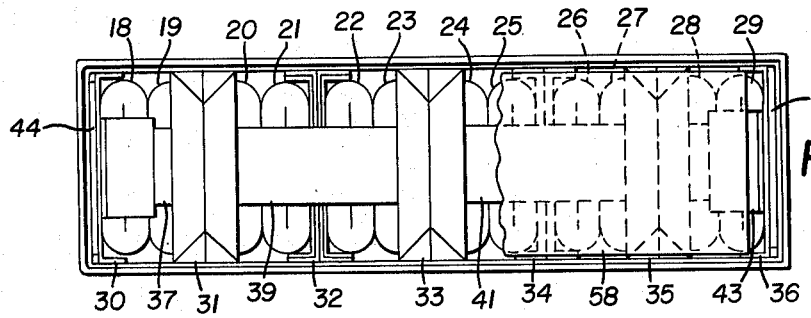
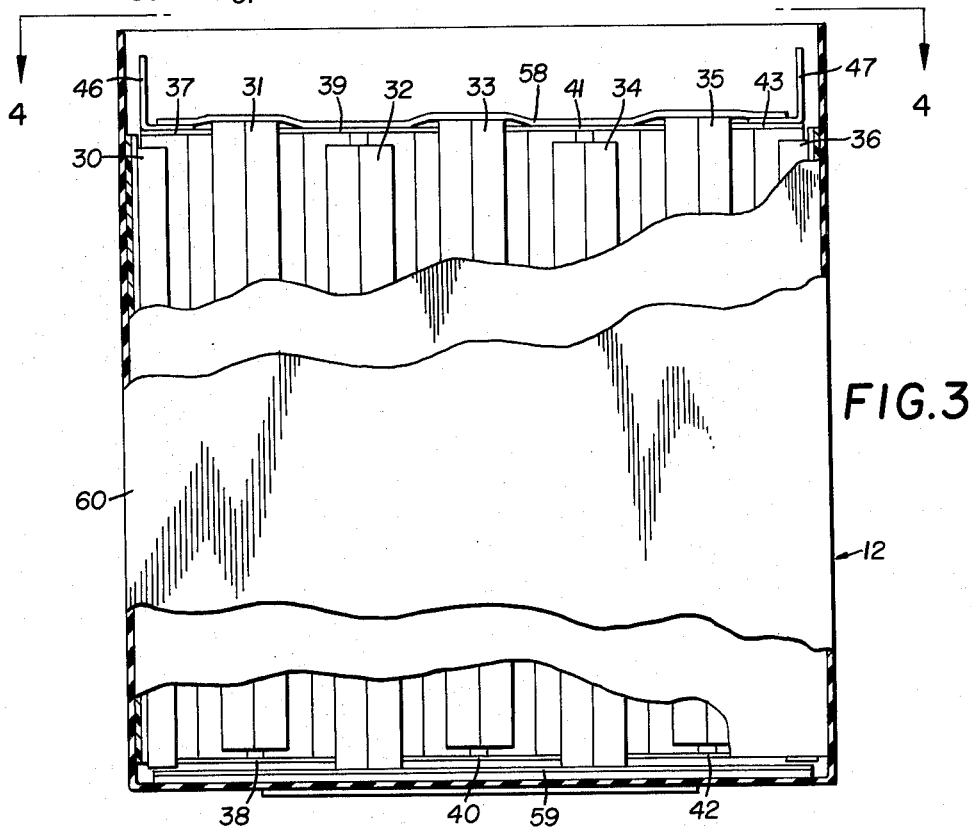
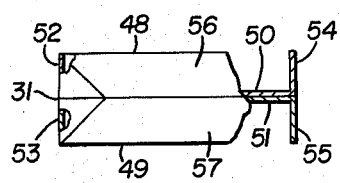
INVENTOR.
DONALD H. LINSON
BY
ATTORNEY

United States Patent Office 3,214,658
Patented Oct. 26, 1965

3,214,658
CAPACITOR INCLUDING ALUMINUM SILICATE SCAVENGER
Donald H. Linson, Mansfield, Ohio, assignor to The Ohio Brass Company, Mansfield, Ohio, a corporation of New Jersey
Filed Dec. 3, 1962, Ser. No. 241,907
12 Claims. (Cl. 317—259)

This invention relates to power capacitors and to enclosed and/or immersed capacitors and electrical apparatus.

A principal object of the invention is to reduce the size of power capacitors, particularly capacitors which are required to be maintained in an energized condition over long periods of time during use thereof.

Another object of the invention is to reduce the operating temperature and to improve the thermal stability of capacitors.

Another object of the invention is to lengthen the useful life of power capacitors.

In using capacitors in power circuits, e.g., for reactance neutralization, load stabilization and the like, the thermal characteristics of the capacitor must be such that the temperature rise is maintained within fixed limits for the entire range of operating conditions. It is known that the conductive effects due to contaminants in the liquid insulating medium used in such capacitors result in conductive currents in the medium which contribute energy to the capacitor as heat. Such contaminants comprise various substances, particles, impurities and the like, largely residues from manufacturing processes. The concentrations of such residues are so low that refinement of the manufacturing process is ineffective or uneconomic as regards improving the performance of the capacitor.

The power capacitor described herein comprises a plurality of capacitor elements, each constituted as a convolutely wound multilayer of foils and paper having a generally elliptical cross section, due to flattening of the element after cylindrical winding of the foil and paper. The capacitor elements are arranged in a flat stack with intervening dividers of insulating material between successive pairs of capacitor elements or pairs of parallel connected groups or banks of elements. The capacitor elements are of the so-called extended foil construction, e.g., having the foils extending one beyond the end of the dielectric paper at one end of the element and the other beyond the end of the dielectric paper at the remaining end of the element, the extended ends of the foils comprising terminals for the capacitor elements. The capacitor elements are connected in series in a serpentine configuration by metallic connectors extending between adjacent pairs of capacitor elements or pairs of parallel elements. The dividers are arranged between the series connected capacitor elements or banks of elements and extend from adjacent the connector at the connector end of the elements to beyond the capacitor elements and connectors at the opposite end of the elements so that the adjacent terminals and connectors are insulated from each other by a projecting portion of the insulating divider. The assemblage of capacitor elements is incorporated in a hermetically sealed container with a liquid insulating and dielectric medium such as a chlorinated diphenyl or other electrical oil and insulated terminal bushings to constitute complete capacitor.

According to the invention, a mat of fibrous aluminum silicate, in sheet form, is incorporated in the capacitor in contact with the liquid medium as a scavenger material for improving the resistivity of the medum, reducing power losses, and to prevent deterioration of the insulating and dielectric medium during operation thereof, such as would result in loss of resistivity. The fiber mat is arranged over the terminal ends of the capacitor elements and is disposed over the connectors and the ends of the dividers. Accordingly, the mat is in close proximity to the terminal connectors of adjacent groups of capacitor elements on opposite sides of the dividers. With this arrangement, it is believed that impurities in the liquid medium, which act as contaminants because of their ionic or other nature and by reason of movement between the connectors and other terminal or conductive members under the influence of the electric field, are immobilized in or removed from the medium by the fibers of the mat. The mat performs a filtering function and tends to remove traces of impurities when the capacitor is filled with the liquid medium, as well as removing residual impurities released from the surfaces of paper, foil, and other parts during operation of the capacitor. In one aspect of the invention, it is preferred that the liquid medium be purified to a high degree before being introduced into the container of the capacitor.

With this arrangement, there is provided a power capacitor significantly smaller in size than heretofore possible. This results from the fact that the improvement in the liquid medium permits a reduction in the amount of insulation in the capacitor, e.g., in the dividers, in the insulating paper on the exterior of the capacitor elements, etc. The lesser bulk of insulating material facilitates heat transfer from the capacitor elements to the side and end walls of the container, and reduces any tendency to develop hot spots. Because of this improvement in heat transfer characteristic, as compared with prior art capacitors, and the elimination of heating effects due to parasitic currents in the insulating oil, the thermal performance of the capacitor is equal to that of larger capacitors having the same voltage and kvar. rating. Other improvements affecting life and durability are described in what follows.

The construction and arrangement of the new capacitor will be understood by reference to the following description taken in connection with the attached claims. The capacitor is illustrated in the accompanying drawings, in which FIG. 1 is a front elevation view of a power capacitor with a portion of the side of the container broken away to show the arrangement of the capacitor elements and scavenger material therein;

FIG. 3 is a side elevation view of a portion of the capacitor of FIG. 1, particularly illustrating the arrangement of the separators and scavenger material;

FIG. 4 is a top section view taken in the direction 4—4 in FIG. 3 and illustrating particularly the arrangement of the separators, terminal connectors and scavenger material at the top end of the capacitor; and FIG. 5 is a top end view, partly in section and partly broken away, of the insulating separators of the capacitor.

Figure 1:
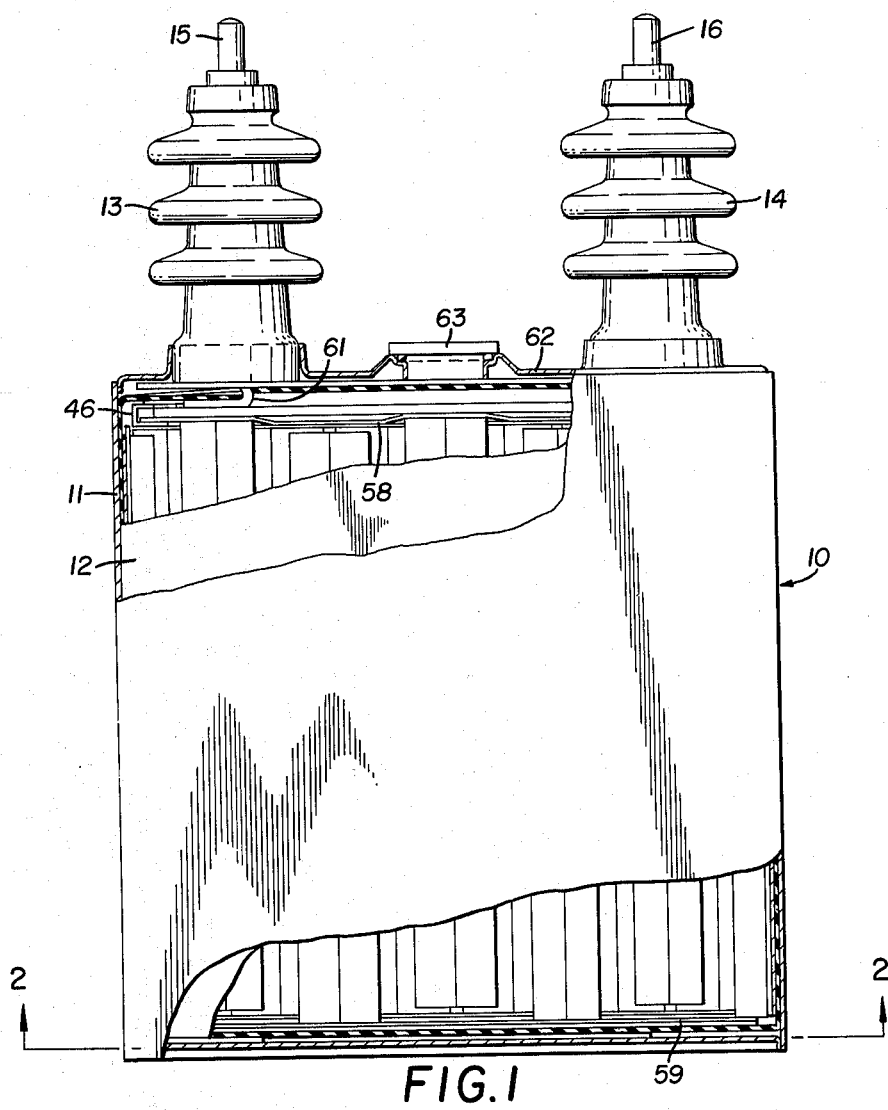

Referring now to FIG. 1, there is shown a capacitor 10 adapted for use in electric power circuits. The capacitor 10 comprises a metal container 11, a capacitor pack 12, and two bushings 13 and 14 having terminal posts 15 and 16. The container 11 and the bushings 13 and 14 are hermetically sealed and the interior of the container is filled with a liquid insulating and dielectric medium such as a chlorinated diphenyl, as hereinafter described.

Figure 2:
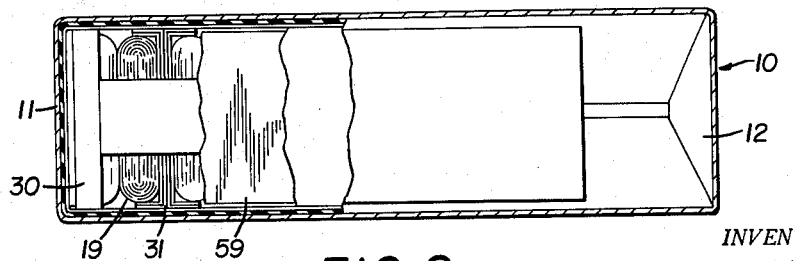
FIG. 2 is a bottom end view of the capacitor of FIG. 1, also showing the arrangement of capacitor elements and scavenger material.

As is shown in FIG. 2 and FIG. 3, the capacitor pack 12 incorporates a stack of capacitor elements 18 to 29 inclusive, each capacitor element being formed as a convolute winding of a multilayer comprising two armature foils, interposed sheets of dielectric paper and sheets of insulating paper. Each foil extends beyond the paper sheets at one end of the sheets so that the end of one foil serves as one terminal and the protruding end of the other foil serves as the remaining terminal for a capacitor element. That portion of the foil which extends beyond the end of the paper is referred to herein as a "terminal foil" for convenience of reference, although a single metallic sheet functions as an armature and as a terminal of the capacitor element.

The capacitor elements are wound upon a cylindrical mandrel and then flattened to produce the shape illustrated in cross section in FIG. 3. The capacitor elements are referred to as having a generally elliptical cross section for convenience of description.

The capacitor elements 18 to 29 are separated by insulating dividers 30 to 36 inclusive and are connected in a series-parallel circuit arrangement by terminal connectors 37 to 43 inclusive. The dividers 30 and 36 function as insulating barriers between the capacitor elements 18 and 29 and the end walls 44 and 45 of the pack and the end walls of the container, and the dividers 32 to 35 inclusive separate adjacent capacitor elements. The terminal connectors 37 ad 43 function to connect the associated capacitor elements 18 and 19 and 28 and 29 respectively in parallel and, with the terminal tabs 46 and 47, to connect the capacitor elements to the terminal posts 15 and 16. The terminal connectors 38 to 42 inclusive function to connect the capacitor elements in parallel in pairs and adjacent pairs of capacitor elements in series.

Successive dividers are oppositely disposed, each divider extending inward between two pairs of capacitor elements, one divider from one end of the capacitor elements and the next adjacent divider from the opposite end of the elements. The terminal foils of the capacitor elements are connected together by a terminal connector arranged over the ends of the capacitor elements at the end of the divider which terminates short of the extremities of the capacitor elements. For example, in FIG. 3 and FIG. 4, the terminal connector 39 extends over the top end of the divider 32 in engagement with the top end terminal foils of the capacitor elements 20, 21, 22 and 23. Thus, the terminal connector 39 simultaneously connects the capacitor elements 20 and 21 and the capacitor elements 22 and 23 in parallel, respectively, and connects the parallel capacitor elements 20 and 21 in series with the parallel capacitor elements 22 and 23. The terminal connector 39 is insulated from the terminal foils of the adjacent capacitor elements 19 and 24 and the associated terminal connectors 37 and 41 by barrier parts of the dividers 31 and 33, as hereinafter described. The same design and arrangement of parts is embodied in the remaining capacitor elements, terminal connectors and dividers to provide a series arrangement of capacitor elements, two by two, between the terminal connectors 46 and 47.

It will be recognized that the benefits of the invention may be achieved even though only single capacitor elements are connected in series. Accordingly, for convenience of description, the capacitor elements are referred to as being connected in series by banks, such description being intended to refer to an arrangement having only single capacitor elements connected in series as well as arrangements having a plurality of capacitor elements connected in parallel in each of the series connected banks. Thus, a stack of capacitor elements may be connected with one, two, three, four, or more, elements in each of several identical banks which are connected in series.

Each of the dividers 31 to 35 is formed in two parts, each identical with the other and the same as the dividers 30 and 36. Thus, in FIG. 5 the divider 31 is constituted as two parts 48 and 49 having longitudinally and transversely extending sheet-like body pieces 50 and 51; oppositely extending side pieces 52 and 53 and 54 and 55 directed perpendicular to the body pieces 50 and 51 in the longitudinal direction of those pieces; and barrier pieces 56 and 57 extending transversely across the ends of the body pieces 50 and 51 and side pieces 52 and 53 respectively. The dividers are arranged so that the body pieces 50 and 51 are interposed between the flat sides of adjacent capacitor elements; the side pieces 52 to 55 extend along the length of the capacitor elements, which is the transverse dimension of the stack, and in the longitudinal direction of the stack; and the barrier pieces 56 and 57 extend over the adjacent portions of the terminal connectors and the terminal foils at the ends of the capacitor elements.

The terminal connectors 37 to 43, illustrated herein, are constituted as flat plate-like metal pieces formed in place by fusing the terminal foils of the capacitor elements together with the appropriate addition of solder metal. Such arrangement has the advantage of compactness and mechanical strength and insures adequate electroconductive connection between the foils of the capacitor elements. Other arrangements, such as the separate flat metal plates mechanically pressed in contact with the extended foils shown in United States Patent 2,933,-664, are contemplated by the invention. The integral soldered plate connector is preferred for various reasons.

According to the invention, there is provided scavenger means in the form of two mats 58 and 59 of fibrous aluminum silicate. The fibrous aluminum silicate is of known composition, formed as a dense association of fibers analogous to a felt and designated herein as a mat. The mat is laid over the ends of the capacitor elements, the connectors, and the ends of the separators so that the fibers are disposed closely adjacent the connectors and the exposed portions of the foils.

The stack of capacitor elements, separators, connectors and discharge resistors (not shown) are provided with a wrapping of insulating paper 60 which extends along and about the sides and front and back of the pack. The paper 60 functions to hold the capacitor elements and separators in compressed relation to achieve a minimum physical volume and maximum heat transfer contact between the capacitor elements and the separators and to provide electrical insulation about the exterior of the elements and between the elements and the container 11. The insulating paper is folded over the bottom end of the pack, as illustrated in FIG. 2. At the top end of the pack (shown in FIG. 1) the tabs 46 and 47 are connected to the terminal posts 15 and 16 by suitable conductors as, e.g., the insulated conductor 61, from the tab 46 to the terminal post 15. The insulating paper is folded over the tabs 46 and 47 and about the terminal conductors and taped together in the same manner as at the bottom end of the pack.

The container 11 is formed with a separate cover 56 which carries the bushings 13 and 14. During assembly, the entire pack 12 is pressed into the container through the open top and is compressively received between the side and end walls of the container. After the pack is inserted into the container, the cover 62 is welded to the walls and the container is evacuated and filled with liquid insulating medium, through the vent 63.

The scavenger mats are constituted by aluminum silicate fibers constituted as mullite and a glassy phase and having a diameter of about two microns and fiber lengths to about one or one and one-half inches. The following represents a typical composition (chemical analysis) of the material:

*Table I*

| | |
|---|---|
| $Al_2O_3$ | 51.2 |
| $SiO_3$ | 47.1 |
| $B_2O_3$ | 0.6 |
| $Na_2O$ | 0.6 |
| Total MgO, CaO, $Fe_2O_3$ | 0.5 |

Ceramic fibers embodying the above composition are manufactured by The Carborundum Company under the trade name, Fiberfrax, and are described in United States Patent 2,557,834. The ceramic fibers may be utilized in connection with the apparatus of the present invention in the form of a felted mat, as above described, or as roving, yarn, cloth, rigid sheet or block, or the like. The fibers may also be embodied as composite materials in which the ceramic fibers are bonded to fibers, strands, sheets, or the like of other materials. However, composite materials are not particularly desirable because of the less favorable ratio of active surface area to the total bulk of the scavenger element formed thereby.

The principal characteristic of aluminum silicate fibers of importance in the invention is that the fibers have the necessary surface activity in conjunction wtih a physical unity such that the fibers retain their material association and position in the capacitor and are not affected by the intense electrical fields about the capacitor elements. One advantage of the use of fibrous aluminum silicate is that the material has a low power factor and does not contribute substantially to the electrical losses of the capacitor. Also, the material has suitable insulating qualities which permit its placement closely adjacent to or in contact with electrically energized conductors and terminals.

In manufacture, the capacitors 10 are heated and dried and have the interior evacuated through the filler 57 in order to remove moisture and adsorbed gases from the capacitor elements, connectors, paper, aluminum foil, aluminum silicate mats, etc. For example, the capacitor may be heated to a temperature of 260 degrees F. at a pressure of 10 to 20 microns of Hg for a period of 24 hours. The capacitor is then filled with chlorinated diphenyl, or other halogenated aryl compound suitable as a liquid electrical insulating dielectric medium, and sealed. Electrical oils comprising known liquid chlorinated polynuclear aromatic hydrocarbon compositions, usually mixtures of specific chlorinated diphenyls of differing chlorine contents averaging, for example, about 60% chlorine by weight, are suitable as liquid electric insulating and dielectric media in capacitors. The invention may be practiced in apparatus utilizing mineral oils therein.

The oil is preferably a commercially available electrical grade of chlorinated diphenyl containing principally trichlorinated and pentachlorinated diphenyl—also referred to as askarel—which is upgraded by further processing in order to remove ionic and other impurities and increase the specific resistivity of the liquid. The upgrading is accomplished according to known procedures wherein activated fuller's earth is mixed with the oil which is then passed through suitable filters to remove the fuller's earth. This procedure removes impurities and contaminants such that the specific resistivity of the upgraded chlorinated diphenyl is better than $600 \times 10^9$ ohm/cm.$^3$. Purities represented by specific resistivities up to $$20,00 \times 10^9 \text{ ohm/cm.}^3$$

are desirable. Upgrading may be accomplished by contacting the chlorinated diphenyl with other known adsorbents of impurities, i.e., activated alumina, and the like.

It appears that the results achieved by the use of ceramic fibers as a scavenger means in a capacitor, as described herein, may be due to the provision of an adsorbent capacity for extremely small concentrations of ionic impurities in the liquid medium. Thus, the ceramic fibers produce significant improvement in the capacitor with commercial electrical oil comprising chlorinated diphenyl and having a very high order of purity at the time of introduction into the container, as represented by specific resistivities in the order of $20,000 \times 10^9$ ohm./cm.$^3$.

Practice of the invention results in substantial improvement in performance of power capacitors as regards temperture rise, length of life, and resistance to effect of transient overvoltages, surges, and the like. The following table sets forth exemplary improvements in power capaictors as determined by electrical measurements of power losses in the capacitor:

*Table II*

| | Secondary Losses Watts/kvar. | Primary Losses at Various Temperatures in Watts/kvar. | | | |
|---|---|---|---|---|---|
| Temp., Deg. C | 28° | 28° | 90° | 100° | 110° |
| With fibrous Al$_2$O$_3$ | 5.52 | 1.02 | 1.74 | 1.78 | 1.82 |
| Without fibrous Al$_2$O$_3$ | 31.0 | 2.07 | 2.06 | 2.14 | 2.47 |

The results set forth in Table II represent a very substantial improvement in capacitor performance. While the reasons for such improvement are not fully understood, the following explanations have been proposed:

First, the ceramic fibers perform the following functions in the capacitor:

(1) The structural arrangement of the scavenger mats in relation to the capacitor elements and dividers, e.g., with the mats disposed over the ends of the capacitor elements, is such that when the container is filled with oil introduced through the filler 57, the oil must, in large part, pass through the mat so that contaminants picked up by the oil in the manifold and in the container are removed before the oil passes into the region about the capacitor elements and into the windings of the capacitor elements.

(2) Impurities, which are held in the paper and foil and which are released into the oil when the container is filled, are immobilized in the mat due to migration or other movement of the impurities under the influence of electric fields between the capacitor elements. Ionic impurities may result from decomposition of the oil and the insulating paper of the capacitor.

(3) In the structural arrangement of the capacitor elements and dividers, impurities in the oil move between the connectors of the element banks on opposite sides of the barrier ends of the dividers or between the connectors and the barrier ends if the scavenger mat is not present. This movement constitutes a conduction current in the oil and transfers energy to the medium in the form of heat. However, in the arrangement of the invention, having the scavenger mat arranged over the connectors and dividers, the impurities are immobilized during movement into the mat. This effect is most pronounced as to impurities in the body of oil above the ends of the elements outwardly from the mat which has not been filtered through the mat during filling.

The functioning of the ceramic fibers as a scavenger, as described, produces the following advantageous results:

(1) The reduction in parasitic heating effects a lower operating temperature for a given capacitor and voltage. This increases the length of life of the capactor.

(2) The dividers may be formed of relatively thin insulating material, paper or the like, so that heat transfer conduction in the longitudinal direction of the packing, toward the ends of the pack and the end walls of the container, is facilitated. This reduces tendency toward formation of hot spots.

(3) The high purity of the chlorinated diphenyl electrical oil as finally embodied in its functional surroundings, i.e., in the sealed container, combined with the continuing scavenger function provided by the aluminum silicate results in the cumulation and concentration of reaction products in the oil and paper (such as might be due to transient overvoltage-induced corona) at a much lesser rate than would otherwise be the case. Accordingly, for a new capacitor, a much longer period of time must elapse before the hydrochloric acid-aluminum chloride cycle (or hydrohalide-aluminum halide cycle in halogenated polycyclic aryl insulating oils generally) is autocatalyzed by the reaction products, i.e., the reaction products reach a concentration such that autocatalysis is initiated. A power capaictor constructed in accordance with the teachings of the present invention has an inherently longer life than capacitors constructed in accordance with the teachings of the prior art, and the useful life of the capacitor is not reduced by transient overvoltages, surges, and the like, to the same extent as in prior art capacitors.

The factors involved in the functioning of the scavenger materials described, e.g., fibrous aluminum silicate, are not clearly understood. Thus, while it might be expected that the ceramic fibers function as adsorbents, as referred to above, tests indicate that the adsorbent mechanism may not be involved. Accordingly, the term "immobilizing" is utilized herein and in the claims to describe the functioning of the fibers without regard to the specific mechanism by which the impurities become attached to and/or held by the fibers, or are otherwise prevented from exercising deleterious effects in the functioning of the capacitor. Accordingly, the explanatory matter set forth above imports no limitation upon the scope of the invention or the validity of the patent.

The impurities referred to herein may be substances in which the molecules are subject to polar effects in the presence of electric fields or substances in which the molecules undergo dissociation in an electrolytic medium. These and other effects are deemed to be within the scope of the invention as hereinafter claimed.

I claim:

1. An electrical apparatus comprising in combination a container, electrical means within the container with two terminals having a voltage difference therebetween, a body of liquid insulating medium in which said electrical means are submerged, and scavenger means including a mat of ceramic fibers disposed in said container in contaminant scavenging relation in said liquid insulating medium.

2. An electrical apparatus comprising in combination a container, electrical means within the container with two terminals having a voltage difference therebetween and a body of liquid insulating medium in which said electrical means are submerged, and scavenger means including a mat of fibrous ceramic aluminum silicate in contaminant scavenging relation in said liquid medium.

3. Electrical apparatus in accordance with claim 2, in which the liquid insulating medium is chlorinated diphenyl.

4. Electrical apparatus in accordance with claim 2, in which the fibrous aluminum silicate has boric oxide $B_2O_3$ incorporated therein.

5. Electrical apparatus in accordance with claim 2, in which the fibrous aluminum silicate has sodium oxide $Na_2O$ incorporated therein.

6. Electrical apparatus in accordance with claim 2, in which the fibrous aluminum silicate incorporates substances from the group comprising magnesium oxide MgO, calcium oxide CaO, and ferric oxide $Fe_2O_3$.

7. Electrical apparatus in accordance with claim 2, in which the said electrical means comprises an electrical conductor and a solid electrically insulating medium and in which the fibrous silicate is arranged between the terminals and adjacent the solid insulating medium and functions to immobilize ionic contaminants originating in the insulating media, 8. Electrical apparatus in accordance with claim 7, in which the liquid insulating medium is chlorinated diphenyl.

9. A capacitor comprising in combination a hermetically sealed container, a stack of capacitor elements with interposed insulating dividers extending in the longitudinal direction of the capacitor elements and of the stack in which successive dividers extend from an exterior point beyond one longitudinal extremity of the elements to an interior point adjacent the opposite longitudinal extremity thereof and the next similarly from the opposite longitudinal extremity in which capacitor elements are connected in series banks by terminal connectors arranged, one at one end of the stack and the next at the other end of the stack, over and across an interior end of an interposed divider, a body of liquid insulating and dielectric medium in which said capacitor elements are submerged, and scavenger means including a fibrous mass, in which the fibers are a ceramic boric oxide and alkali metal oxide-containing aluminum silicate, in which aluminum silicate the proportions of alumina/silicia are within the limits of 45 to 55 parts by weight of alumina to 55 to 45 parts by weight of silica, and the boric oxide and alkali metal oxide total less than 10%, of the mass said mass being disposed over the exterior ends of the capacitor elements and said scavenger means functioning to immobilize contaminants in the liquid medium in the region adjacent the exterior ends of the dividers.

10. A capacitor in accordance with claim 9, in which the aluminum silicate is in the form of a felted mat of fibers in contact with the said elements, connectors and dividers.

11. A capacitor in accordance with claim 10, in which the said capacitor elements, dividers, mat and terminal connectors are in the form of a pack having sheet insulating means extending about the parts thereof and comprising an insulating layer about the said parts and between the two parts and the said container, and the said pack being compressively received in the container, all for facilitating heat transmittal from the interior of the pack to the container.

12. A capacitor in accordance with claim 9, in which the said dividers extend along the sides and over the ends of the capacitor elements and the capacitor elements and separators are spaced apart along the longitudinal sides of the capacitor elements adjacent the side walls of the container for fluid communication with the region adjacent the fibrous aluminum silicate.

References Cited by the Examiner

UNITED STATES PATENTS

| | | | |
|---|---|---|---|
| 1,994,302 | 3/35 | Clark | 317—259 |
| 2,112,322 | 3/38 | Wyatt | 317—259 |
| 2,505,581 | 4/50 | Unger | 174—14 |
| 2,557,834 | 6/51 | McMullen | 106—50 |
| 2,594,872 | 4/52 | Clark | 317—259 |
| 2,933,664 | 4/60 | Linderholm | 317—243 |

LARAMIE E. ASKIN, *Primary Examiner.*

JOHN P. WILDMAN, JOHN F. BURNS, *Examiners.*